US012780541B2

(12) United States Patent
Yoshimoto

(10) Patent No.: US 12,780,541 B2
(45) Date of Patent: Nov. 3, 2026

(54) ARTICLE STORAGE SHELF

(71) Applicant: Daifuku Co., Ltd., Osaka (JP)

(72) Inventor: Tadahiro Yoshimoto, Hinocho (JP)

(73) Assignee: Daifuku Co., Ltd., Osaka (JP)

( * ) Notice: Subject to any disclaimer, the term of this patent is extended or adjusted under 35 U.S.C. 154(b) by 365 days.

(21) Appl. No.: 18/517,704

(22) Filed: Nov. 22, 2023

(65) Prior Publication Data

US 2024/0174442 A1 May 30, 2024

(30) Foreign Application Priority Data

Nov. 24, 2022 (JP) ................................ 2022-187368

(51) Int. Cl.
*B65G 1/06* (2006.01)
*B65G 1/04* (2006.01)

(52) U.S. Cl.
CPC ............. *B65G 1/06* (2013.01); *B65G 1/0407* (2013.01)

(58) Field of Classification Search
CPC ...... B65G 1/0435; B65G 1/0407; B65G 1/06; B65G 1/0428; H01L 21/67769; H10P 72/3404
See application file for complete search history.

(56) References Cited

U.S. PATENT DOCUMENTS

| | | | | | |
|---|---|---|---|---|---|
| 2002/0114687 | A1* | 8/2002 | Inui | B65G 1/045 | 414/331.03 |
| 2008/0056860 | A1* | 3/2008 | Natume | H01L 21/67769 | 414/673 |
| 2009/0206048 | A1* | 8/2009 | Wada | B65G 1/0457 | 212/71 |
| 2015/0000372 | A1 | 1/2015 | Otsuka et al. | | |
| 2017/0194184 | A1 | 7/2017 | Tominaga | | |
| 2022/0415689 | A1* | 12/2022 | Jo | B65G 1/02 | |

FOREIGN PATENT DOCUMENTS

| | | | |
|---|---|---|---|
| JP | 201512040 | A | 1/2015 |
| JP | 2017121987 | A | 7/2017 |

* cited by examiner

*Primary Examiner* — Glenn F Myers
(74) *Attorney, Agent, or Firm* — The Webb Law Firm

(57) ABSTRACT

An article storage shelf includes a shelf frame; a shelf body configured to support an article as a storage target; and a transfer device. The transfer device includes a support section configured to support the article, and a drive mechanism. The shelf body includes an attachment section attached to the shelf frame, and a support plate section projecting toward a first-direction first side from the attachment section. The support plate section has a notch penetrating through the support plate section in the up-down direction and opened toward the first-direction first side, and a through-opening disposed on a first-direction second side relative to the notch and penetrating through the support plate section in the up-down direction. The through-opening is disposed between a third support pin and the attachment section in the first direction and has a dimension, in a second direction, that is larger than a dimension in a first direction.

8 Claims, 10 Drawing Sheets

ARTICLE STORAGE SHELF

CROSS-REFERENCE TO RELATED APPLICATION

This application claims priority to Japanese Patent Application No. 2022-187368 filed Nov. 24, 2022, the disclosure of which is hereby incorporated by reference in its entirety.

BACKGROUND OF THE INVENTION

1. Field of the Invention

The present invention relates to an article storage shelf including: a shelf frame; a shelf body attached to the shelf frame in a cantilever manner and configured to support an article as a storage target; and a transfer device configured to transfer the article supported by the shelf body.

2. Description of Related Art

For example, Japanese Unexamined Patent Application Publication No. 2017-121987 (Patent Literature 1) describes a technology related to an article storage shelf. Hereinafter, reference signs described within parentheses in the Description of the Related Art are reference signs used in Patent Literature 1.

The article storage shelf in Patent Literature 1 includes: a shelf frame; a plurality of shelf bodies (S) configured to support an article (a semiconductor container B); and a transfer device (a stacker crane C) configured to transfer the article to and from the shelf bodies. Each of the plurality of shelf bodies (S) is attached to the shelf frame in a cantilever manner. The shelf body (S) includes a support plate section (50) along a horizontal plane, and the support plate section (50) has a notch (50Y) penetrating through the support plate section (50) in an up-down direction and opened toward a projection direction. The notch (50Y) is formed such that a support section (a movable support 24) of the transfer device passes through the notch (50Y) in the up-down direction. Further, the support plate section (50) includes three support pins (positioning pins P) formed on the top surface of the support plate section (50) such that the three support pins support the article from the lower side and position the article. Two support pins (positioning pins P2) out of the three support pins are provided to be distanced from each other in a shelf right-left direction to sandwich the notch (50Y) therebetween. The remaining one support pin (a positioning pin P1) is adjacent to a shelf frame side of the notch (50Y).

In the article storage shelf as described in Patent Literature 1, the notch may be formed in a wide area of the support plate section of the shelf body. In such a shelf body, the rigidity of a part, of the support plate section, where the notch is formed is often lower than the rigidity of a part closer to the shelf frame than the notch. Accordingly, while the article is supported, the part, of the support plate section, where the notch is formed is easy to greatly bend as compared to the part closer to the shelf frame than the notch. When large bending occurs in the support plate section, the flatness of the support plate section between the three support pins decreases, which may cause a problem that the stability in support for the article cannot be secured sufficiently. In view of this, it is conceivable that reinforcement to attach reinforcing members or the like to parts of the support plate section between the three support pins is performed to increase the rigidity of the support plate section, thereby reducing bending. However, the size or the weight of the support plate section increases, which may eventually cause problems such as upsizing of the shelf body and an increase in cost.

SUMMARY OF THE INVENTION

In view of the foregoing, it is desired to attain an article storage shelf that easily secures stability in support for an article with a relatively simple configuration even in a case where a notch is formed in a support plate section of a shelf body.

An article storage shelf according to this disclosure includes: a shelf frame; a shelf body attached to the shelf frame in a cantilever manner and configured to support an article as a storage target; and a transfer device configured to transfer the article supported by the shelf body. When a first direction is a specific direction along a horizontal plane, a first-direction first side is one side in the first direction, a first-direction second side is the other side in the first direction, and a second direction is a direction along the horizontal plane and perpendicular to the first direction, the transfer device includes a support section configured to support the article, and a drive mechanism configured to advance and retract the support section in the first direction and to lift and lower the support section in an up-down direction. The shelf body includes an attachment section attached to the shelf frame, a support plate section disposed to project from the attachment section toward the first-direction first side and formed in a plate shape along the horizontal plane, and a first support pin, a second support pin, and a third support pin as three support pins fixed to the support plate section to project upward from the support plate section such that the three support pins support the article from a lower side. The support plate section has a notch penetrating through the support plate section in the up-down direction and opened toward the first-direction first side such that the support section of the transfer device is passable through the notch in the up-down direction, and a through-opening disposed on the first-direction second side relative to the notch and penetrating through the support plate section in the up-down direction. The first support pin and the second support pin are disposed on opposite sides across the notch in the second direction. The third support pin is disposed between the notch and the through-opening in the first direction. The through-opening is disposed between the third support pin and the attachment section in the first direction and has a dimension, in the second direction, that is larger than a dimension in the first direction.

In this configuration, the support plate section has the through-opening penetrating therethrough in the up-down direction and formed between the third support pin of the support plate section and the attachment section in the first direction. The through-opening has the dimension, in the second direction (the width direction of the support plate section), that is larger than the dimension in the first direction (the depth direction of the support plate section). Hereby, the rigidity of a part between the third support pin of the support plate section and the attachment section in the first direction is lowered as compared with a case where no through-opening is formed, so that the part easily bends. This accordingly makes it possible to relatively raise the rigidity of a part of the support plate section between the third support pin and each of the first support pin and the second support pin, thereby making it possible to restrain bending in the part between the third support pin and each of the first support pin and the second support pin while the article is supported. Accordingly, while the article is supported, the flatness of the support plate section between the third support pin and each of the first support pin and the second support pin is easily secured, so that the stability of support for the article is easily secured.

Further, in this configuration, when downflow as airflow flowing downward is generated inside the article storage shelf, the airflow can pass through the through-opening as well as the notch. That is, the shelf body can be made hard to prevent the downflow, as compared with a case where no through-opening is formed.

Thus, with this configuration, even in a case where the notch is formed in the support plate section of the shelf body, the stability of support for the article is easily secured with a relatively simple configuration.

Further features and advantages of the article storage shelf are made clear from the following description on exemplary and nonlimiting embodiments to be described with reference to the drawings.

DESCRIPTION OF THE INVENTION

Figure 1:
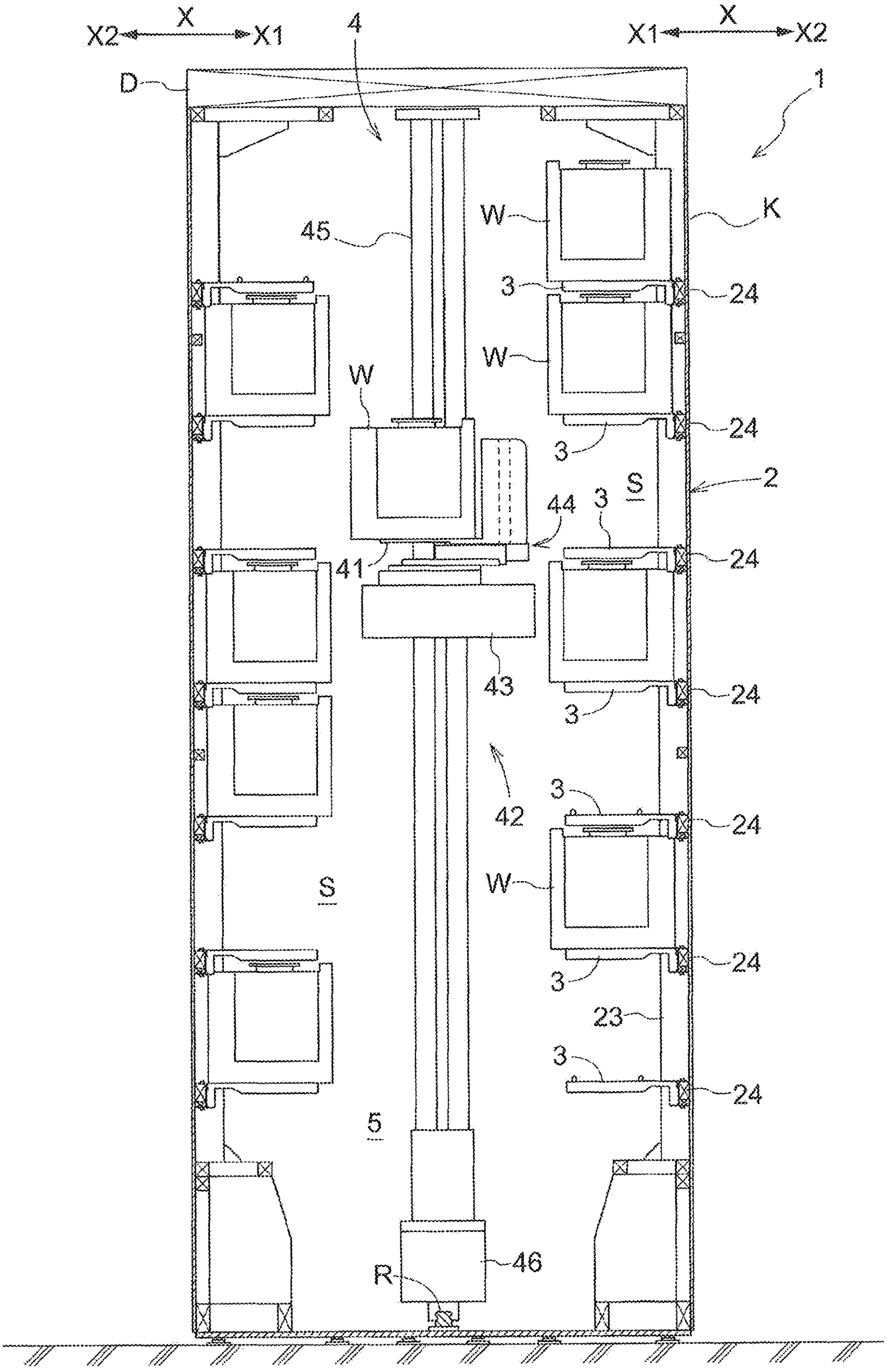
FIG. 1 is a sectional view illustrating a whole article storage shelf.

The following describes an embodiment of an article storage shelf with reference to the drawings. As illustrated in FIG. 1, an article storage shelf 1 includes a shelf frame 2, a shelf body 3 attached to the shelf frame 2 in a cantilever manner and configured to support an article W as a storage target, and a transfer device 4 configured to transfer the article W supported by the shelf body 3. In the present embodiment, the article storage shelf 1 includes a plurality of shelf bodies 3. The shelf frame 2 is configured such that the plurality of shelf bodies 3 is attached thereto. Each of the plurality of shelf bodies 3 attached to the shelf frame 2 supports an article W. Thus, the article storage shelf 1 can store a plurality of articles W. The transfer device 4 transports the article W between each of the plurality of shelf bodies 3 and the outside of the article storage shelf 1. In the example of FIG. 1, the article storage shelf 1 includes paired shelf frames 2. The paired shelf frames 2 are provided to face each other across the transfer device 4. The article storage shelf 1 includes a conveyer (not illustrated) connecting the inside and the outside of the article storage shelf 1, and the transfer device 4 transports the article W between the shelf body 3 and the conveyer. In this example, the article W is a FOUP (Front Opening Unified Pod) for storing semiconductor substrates (wafers).

Figure 5:
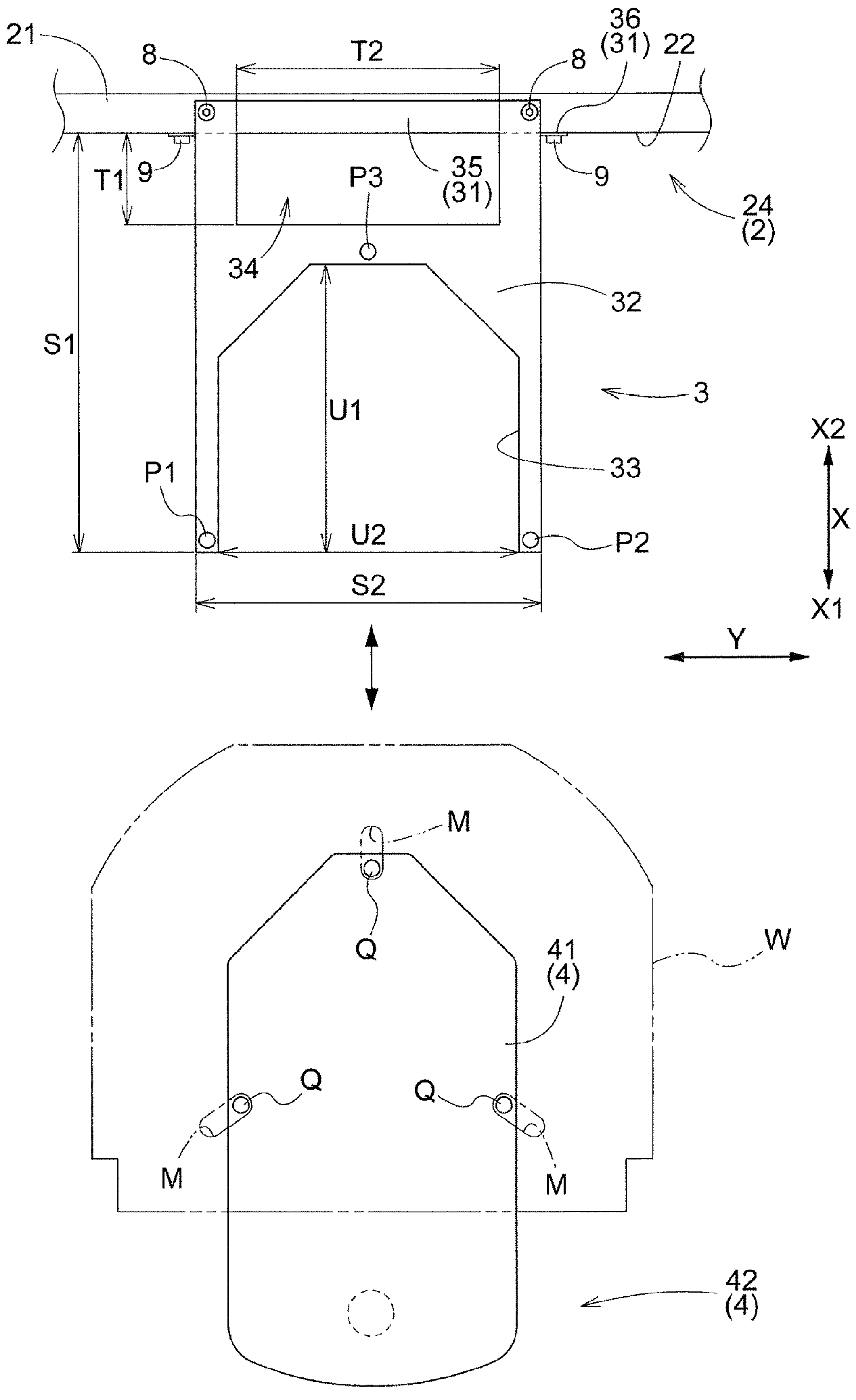
FIG. 5 is a plan view of the shelf body.

In the following description, a specific direction along a horizontal plane is defined as a first direction X, one side in the first direction X is defined as a first-direction first side X1, the other side in the first direction X is defined as a first-direction second side X2, and a direction along the horizontal plane and perpendicular to the first direction X is defined as a second direction Y. In the present embodiment, the first direction X is a projection direction (an extending direction) of the shelf body 3 attached to the shelf frame 2 in a cantilever manner. The first-direction second side X2 is a side, in the first direction X, where the shelf frame 2 is disposed relative to the shelf body 3, and its opposite side is the first-direction first side X1. In the example of FIGS. 1 and 5, the first-direction first side X1 is a side where the transfer device 4 is disposed relative to the shelf body 3.

As illustrated in FIGS. 1 and 5, the transfer device 4 includes a support section 41 configured to support the article W, and a drive mechanism 42 configured to advance and retract the support section 41 in the first direction X and to lift and lower the support section 41 in the up-down direction. In the present embodiment, the transfer device 4 further includes a wagon section 46. The wagon section 46 moves on a passage 5 disposed in front of the shelf frame 2 (herein, the passage 5 disposed between the paired shelf frames 2). The support section 41 is connected to the wagon section 46 via the drive mechanism 42. The support section 41 and the drive mechanism 42 move on the passage 5 together with the wagon section 46. In the example of FIG. 1, a rail R is disposed along the passage 5. The wagon section 46 is guided by the rail R to move on the passage 5.

Figure 4:
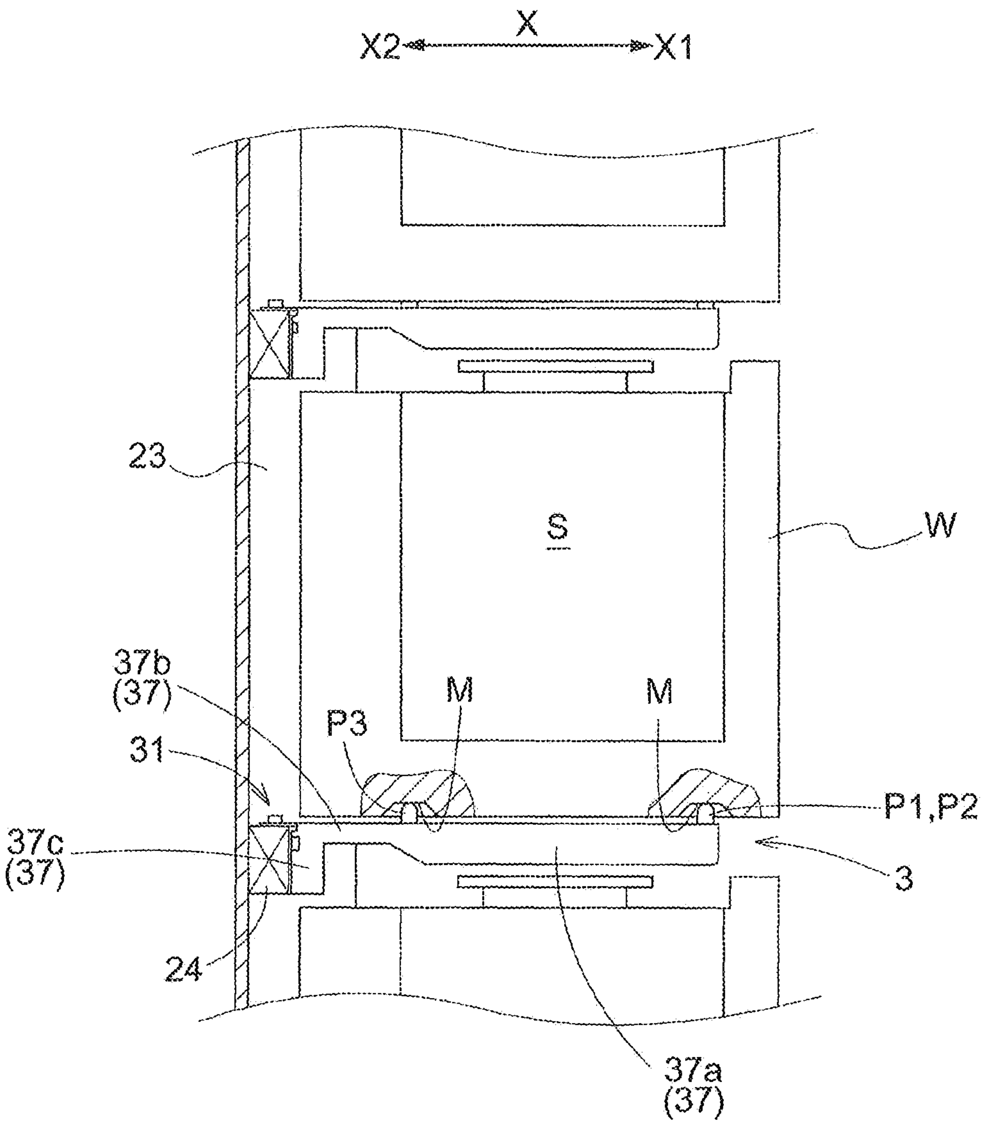
FIG. 4 is a side view schematically illustrating a state where an article is supported by the shelf body.

The drive mechanism 42 includes a mast 45 standing from the wagon section 46, a lifting and lowering table 43 configured to be lifted and lowered along the mast 45, and a sliding mechanism 44. The sliding mechanism 44 is provided in the lifting and lowering table 43. The support section 41 is connected to the sliding mechanism 44. The sliding mechanism 44 allows the support section 41 to advance and retract in the first direction X. The support section 41 supports the article W from its lower side. In addition, as illustrated in FIG. 5, the support section 41 includes a plurality of (here, three) transfer support pins Q engageable with respective engagement sections M of the article W from the lower side. The support section 41 supports the bottom face of the article W from the lower side with the plurality of transfer support pins Q being engaged with the engagement sections M of the article W from the lower side. In the example of FIGS. 1 and 5, the transfer device 4 is a stacker crane. That is, in this example, the support section 41 and the drive mechanism 42 of the transfer device 4 are provided in a device (herein, the stacker crane) for transporting the article W. Further, the sliding mechanism 44 and the support section 41 are a slide-fork type. Note that, in this example, as illustrated in FIGS. 4 and 5, three engagement sections M engageable with the three transfer support pins Q are provided on the bottom surface of the article W. Further, the three engagement sections M are also engageable with three support pins (a first support pin P1, a second support pin P2, a third support pin P3) (described later) provided in the shelf body 3.

Figure 2:
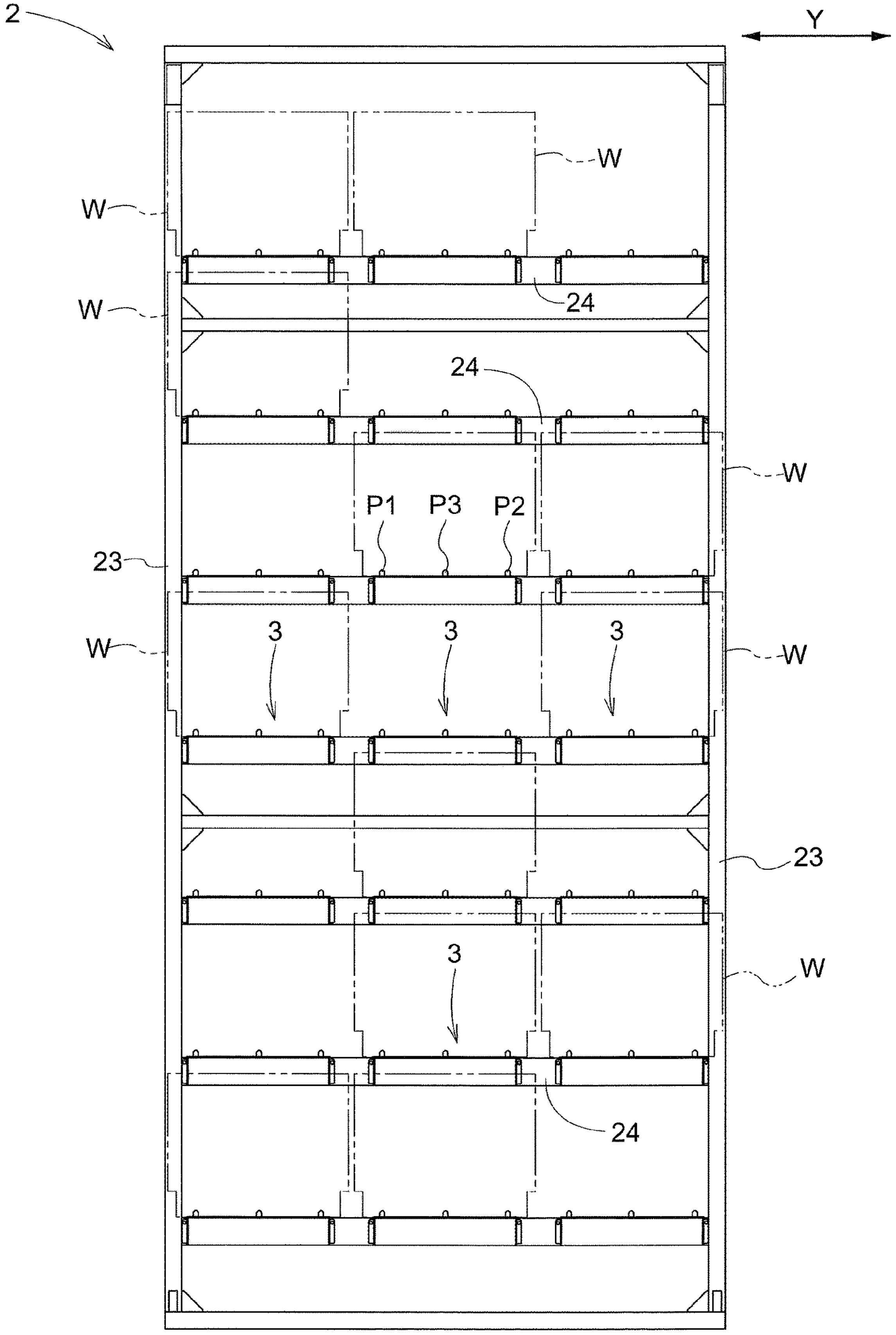
FIG. 2 is a front view illustrating the article storage shelf.

As illustrated in FIGS. 1 and 2, in the present embodiment, the shelf frame 2 has a top surface 21 facing upward and a reference surface 22 facing the first-direction first side X1. The shelf body 3 is supported by the shelf frame 2 via the top surface 21 and the reference surface 22. In this example, the shelf frame 2 includes supports 23 and traverse members 24. The traverse member 24 is supported by the supports 23 and supports a plurality of shelf bodies 3. The top surface 21 is a surface, of the traverse member 24, that faces upward. Further, the reference surface 22 is a side face (herein, a surface facing the first-direction first side X1) of the traverse member 24. In the example of FIGS. 1 and 2, paired supports 23 are disposed to be separated from each other in the second direction Y. Each of the plurality of traverse members 24 has a posture along the second direction Y and is disposed to connect the paired supports 23 to each other. More specifically, opposite ends of each of the traverse members 24 are fixed to the paired supports 23, respectively. Further, the plurality of traverse members 24 is aligned to be distanced from each other in the up-down direction. Each of the traverse members 24 aligned in the up-down direction supports a plurality of (here, three) shelf bodies 3 aligned along the second direction Y. Thus, the plurality of shelf bodies 3 is aligned in the second direction Y and is also aligned in the up-down direction. As illustrated in FIGS. 1 and 4, articles W supported by the shelf bodies 3 are stored between traverse members 24 adjacent to each other in the up-down direction. That is, a storage space S for storing the article W is formed between shelf bodies 3 adjacent to each other in the up-down direction, and the traverse members 24 are disposed to be adjacent to each other in the up-down direction with a distance that allows such a storage space S to be secured.

In this example, the article storage shelf 1 further includes a section wall k and an airflow generator D. In the example of FIG. 1, the section wall k is disposed to separate an internal space inside the article storage shelf 1 for storing the articles W from an exterior space outside the article storage shelf 1. The airflow generator D is provided above the paired shelf frames 2 and generates airflow (downflow) flowing downward from the upper side in the internal space (herein, the range where the shelf frames 2 and the transfer device 4 are present).

As illustrated in FIGS. 3 to 6, the shelf body 3 includes an attachment section 31 attached to the shelf frame 2, a support plate section 32 disposed to project from the attachment section 31 toward the first-direction first side X1 and formed in a plate shape along the horizontal plane, and the first support pin P1, the second support pin P2, and the third support pin P3 as three support pins fixed to the support plate section 32 to project upward from the support plate section 32 such that the three support pins support the article W from the lower side. The following describes the configuration of the shelf body 3 more specifically.

The attachment section 31 is attached to the shelf frame 2, so that the shelf body 3 is supported by the shelf frame 2 (herein, the traverse member 24). In the present embodiment, the attachment section 31 includes a first abutment section 35 abutting with the top surface 21 and a second abutment section 36 abutting with the reference surface 22. In this example, the bottom surface of the first abutment section 35 abuts with the top surface 21. Hereby, the shelf body 3 is positioned relative to the up-down direction. Further, a surface, of the second abutment section 36, facing the first-direction second side X2 abuts with the reference surface 22. Hereby, the shelf body 3 is positioned relative to the first direction X. Further, as will be described later, each of the first abutment section 35 and the second abutment section 36 of the attachment section 31 in the shelf body 3 is fixed to the traverse member 24.

The first abutment section 35 is formed to extend toward the first-direction second side X2 from a base end (herein, an end part on the first-direction second side X2) of the support plate section 32. In the example illustrated herein, the first abutment section 35 is formed into a rectangular shape in a top-bottom view, and the dimension of the first abutment section 35 in the first direction X is set to a size corresponding to the dimension of the top surface 21 in the first direction X. Further, the dimension of the first abutment section 35 in the second direction Y is the same as a dimension S2 (see FIG. 5) of the support plate section 32 in the second direction Y. Note that respective dimensions of the first abutment section 35 in the first direction X and the second direction Y can be changed appropriately. Further, the shape of the first abutment section 35 is not limited to the rectangular shape. Further, a plurality of first abutment sections 35 may be provided. For example, each of the plurality of first abutment sections 35 may extend from the base end of the support plate section 32 toward the first-direction second side X2.

The second abutment section 36 is formed to be bent outwardly in the second direction Y from a base end (herein, an end part on the first-direction second side X2) of a support frame section 37 (described later) relative to the first abutment section 35 (herein, the first abutment section 35 and the support plate section 32). Further, the second abutment section 36 has a dimension in the up-down direction that is set to a size corresponding to the dimension of the reference surface 22 in the up-down direction. Further, in this example, a plurality of second abutment sections 36 is provided. More specifically, paired second abutment sections 36 are formed to be separated from each other in the second direction Y. The paired second abutment sections 36 are disposed to sandwich the first abutment section 35 and the support plate section 32.

Note that the dimension of the second abutment section 36 in the up-down direction can be changed appropriately. Further, the second abutment section 36 may be formed to be bent downward by a side edge of the support plate section 32 in the second direction Y. Further, the second abutment section 36 may be disposed inwardly, in the second direction Y, from the first abutment section 35 and the support plate section 32.

Figure 3:
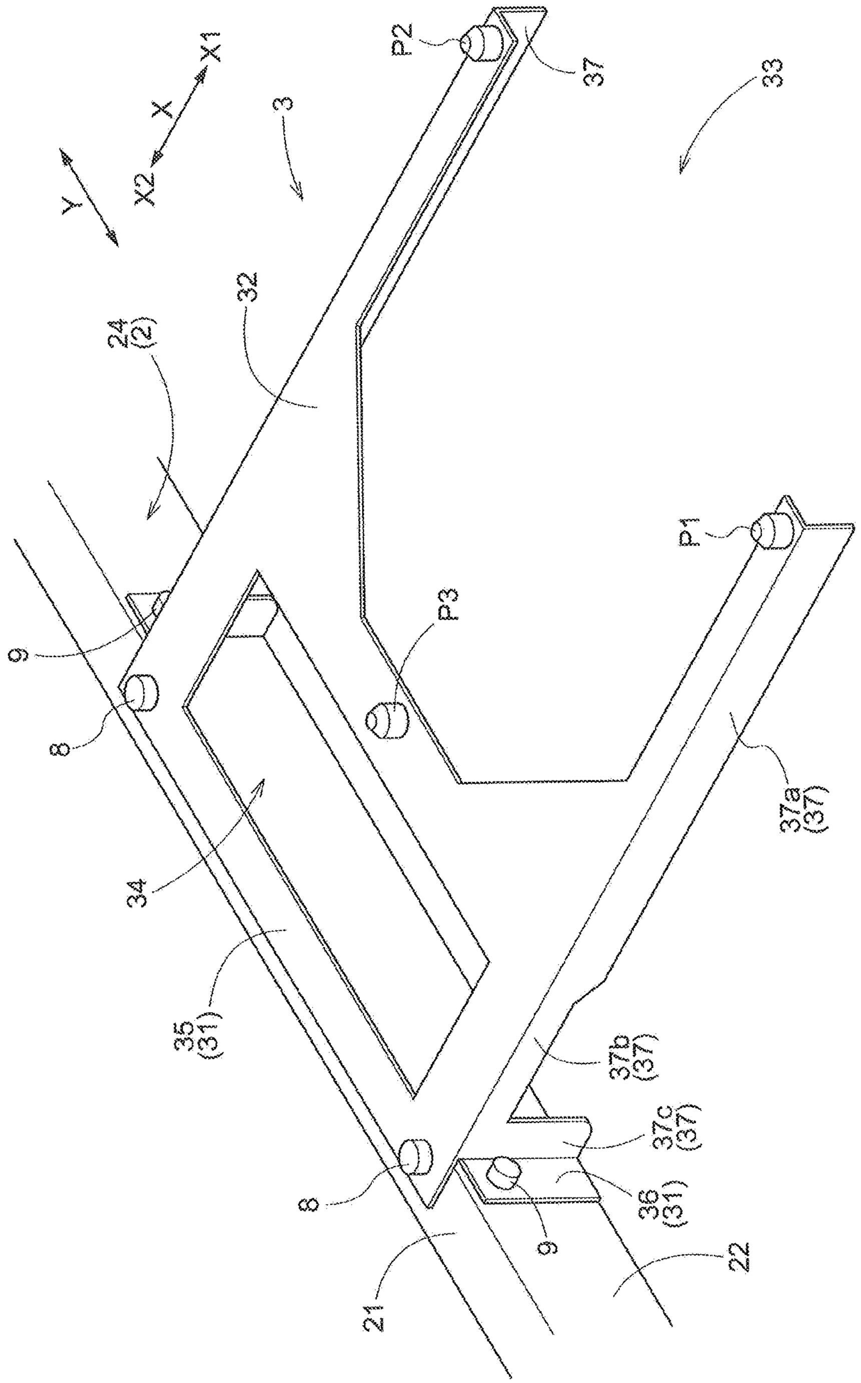
FIG. 3 is a perspective view of the shelf body.
Figure 6:
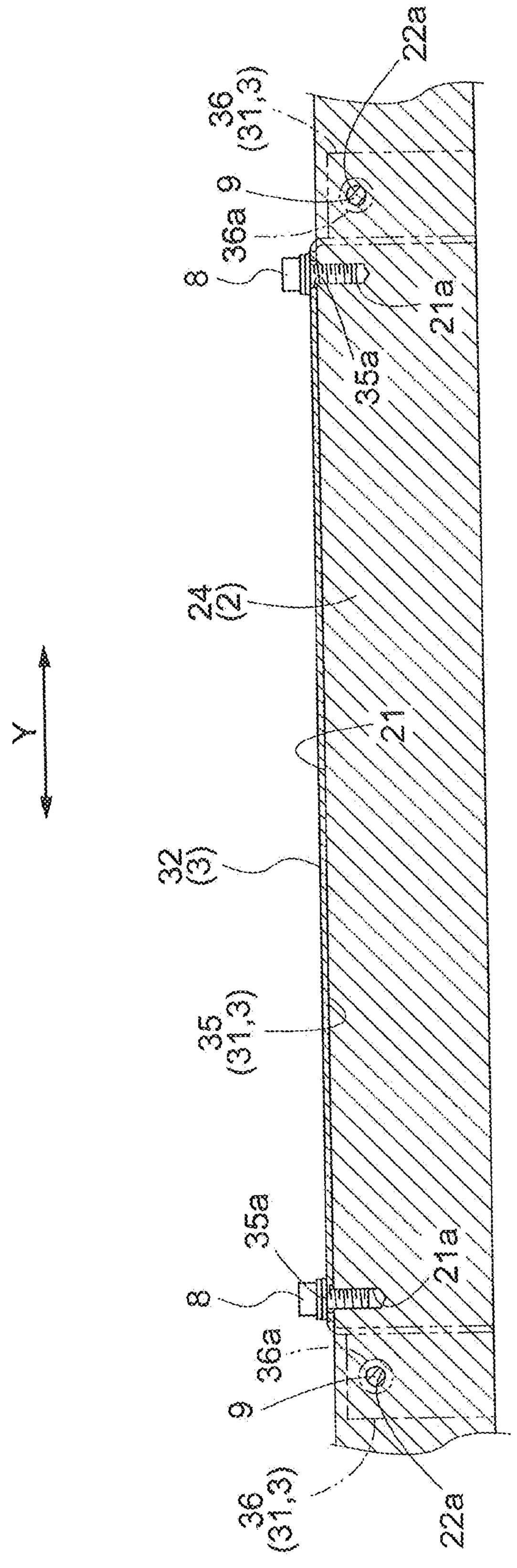
FIG. 6 is a sectional view schematically illustrating a state where the shelf body is supported by a shelf frame.

As illustrated in FIGS. 3, 5, and 6, in the present embodiment, the first abutment section 35 is fastened and fixed to the top surface 21 by first fastening members 8. Further, the second abutment sections 36 are fastened and fixed to the reference surface 22 by second fastening members 9. In this example, the first abutment section 35 is fastened and fixed to the top surface 21 of the traverse member 24 by the first fastening members 8. Similarly, the second abutment sections 36 are fastened and fixed to the reference surface 22 by the second fastening members 9.

In the example illustrated herein, opposite end parts, in the second direction Y, of the first abutment section 35 are fastened and fixed to the top surface 21 by the first fastening members 8. That is, the first abutment section 35 is fastened and fixed to the top surface 21 at a plurality of (herein, two) points. Here, the first fastening members 8 are bolts each including a head and an external threaded section. As illustrated in FIG. 6, the first abutment section 35 has a first through-hole 35*a* in either end part in the second direction Y such that the first fastening member 8 is passed through the first through-hole 35*a*. The traverse member 24 has a first internal-thread hole 21*a* into which the first fastening member 8 is inserted from the top surface 21. The external threaded section of the first fastening member 8 passed through the first through-hole 35*a* with the head being disposed on the upper side is engaged threadedly with the first internal-thread hole 21*a*, so that the first abutment section 35 is fastened and fixed to the top surface 21 of the traverse member 24.

As illustrated in FIGS. 3, 5, and 6, each of the second abutment sections 36 separated from each other in the second direction Y is fastened and fixed to the reference surface 22 by the second fastening member 9. In the present embodiment, the second fastening member 9 is disposed above the middle position, in the up-down direction, of the second abutment section 36. In the example illustrated herein, the second fastening member 9 is a bolt including a head and an external threaded section. Each of the second abutment sections 36 separated from each other in the second direction Y has a second through-hole 36*a* formed above the middle position, in the up-down direction, of the each of the second abutment sections 36 such that the second fastening member 9 is passed through the second through-hole 36*a*. The traverse member 24 has a second internal-thread hole 22*a* into which the second fastening member 9 is inserted from the reference surface 22 (a surface facing the first-direction first side X1). The external threaded section of the second fastening member 9 passed through the second through-hole 36*a* with the head being disposed on the first-direction first side X1 is engaged threadedly with the second internal-thread hole 22*a*, so that the second abutment section 36 is fastened and fixed to the reference surface 22. Thus, the shelf body 3 is fixed to the traverse member 24. Hereby, the shelf body 3 can be positioned in the up-down direction and in the first direction X relative to the shelf frame 2 and fixed to the shelf frame 2. This makes it possible to easily raise the positional accuracy (including an angle from the horizontal plane) of a shelf board. Note that the shelf body 3 may be fixed to the traverse member 24 by other well-known technology such as welding, for example.

Figure 7:
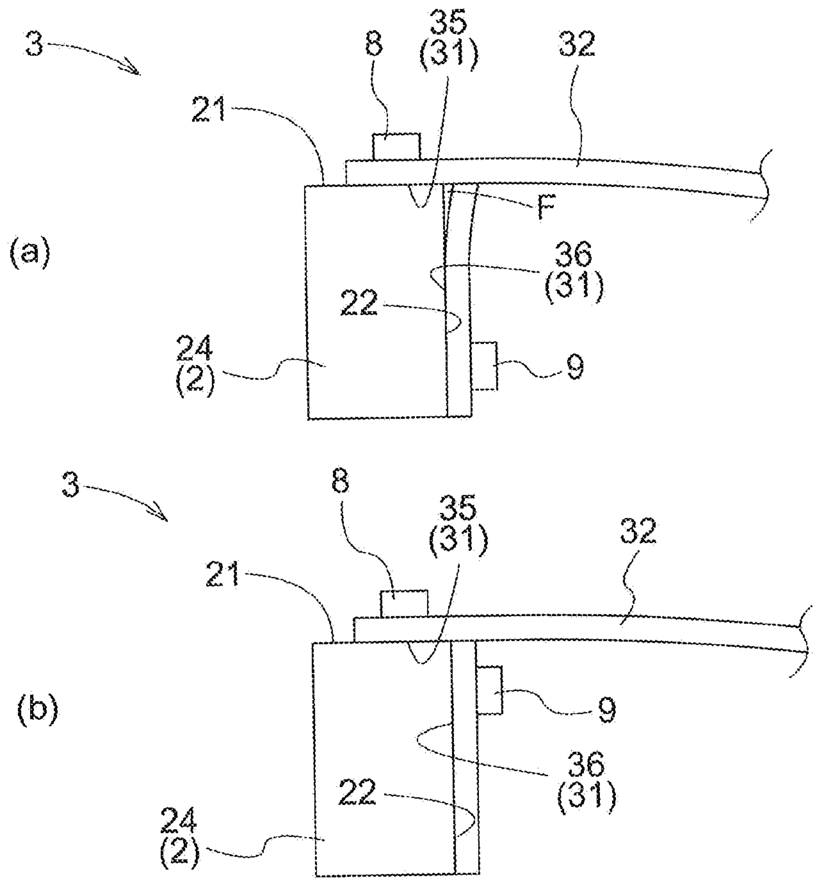
FIG. 7 is an explanatory view of a gap that can be formed between the shelf body and a traverse member.

FIG. 7(*a*) illustrates a fixed state of the second abutment section 36, different from the present embodiment. Herein, the second abutment section 36 and the reference surface 22 are fastened and fixed to each other by the second fastening member 9 below the middle position, in the up-down direction, of the second abutment section 36. In this case, depending on the weight of the supported article W, a gap F may be formed between the second abutment section 36 and the reference surface 22 due to a moment applied to the second abutment section 36 by a vertical load applied to the support plate section 32, the moment being applied with a fastening part by the second fastening member 9 being serving as a fulcrum. FIG. 7(*b*) illustrates a fixed state of the second abutment section 36 in the present embodiment. Herein, the second abutment section 36 and the reference surface 22 are fastened and fixed to each other by the second fastening member 9 above the middle position, in the up-down direction, of the second abutment section 36. In this case, while the article W is supported by the shelf body 3, a force in a direction where the second abutment section 36 is pressed against the reference surface 22 is applied to a part, of the second abutment section 36, below the fastening part by the second fastening member 9. Accordingly, even in a state where an article W with a relatively large weight is supported, the whole second abutment section 36 is easily brought into contact with the reference surface 22 without any gap, thereby making it possible to easily raise the positional accuracy of the shelf body 3. Note that the gap F is illustrated to be larger than its actual size in FIG. 7 to describe the gap F clearly.

In the present embodiment, as illustrated in FIGS. 3 and 4, the shelf body 3 further includes support frame sections 37 formed to be bent downward from opposite side edges, in the second direction Y, of the support plate section 32. Further, the support frame section 37 is formed in a range from positions, in the first direction X, where the first support pin P1 and the second support pin P2 are disposed to the attachment section 31. In this example, the support frame section 37 is formed in a range from an end part (a distal end part of the support plate section 32), on the first-direction first side X1, of the support plate section 32 to an end part (a base end part of the support plate section 32), on the first-direction second side X2, of the support plate section 32.

In this example, the support frame section 37 includes a first support frame 37*a*, a second support frame 37*b*, and a third support frame 37*c*. The first support frame 37*a*, the second support frame 37*b*, and the third support frame 37*c* are disposed along the first direction X sequentially from the first-direction first side X1. As illustrated in FIG. 4, the first support frame 37*a* is disposed closer to the first-direction first side X1 (the distal end side of the support plate section 32) than the third support pin P3 in the first direction X. The first support pin P1, the second support pin P2, and a notch 33 (described later) are included in a range, in the first direction X, where the first support frame 37*a* is formed (FIG. 3). The second support frame 37*b* is disposed between the third support pin P3 and a part before the attachment section 31 in the first direction X. The third support pin P3 and a through-opening 34 (described later) are included in a range, in the first direction X, where the second support frame 37*b* is formed (FIG. 3). The third support frame 37*c* is disposed between an end part, on the first-direction second side X2, of the second support frame 37*b* and the second abutment section 36 in the first direction X.

As illustrated in FIGS. 3 and 4, in the present embodiment, the dimension of the support frame section 37 in the up-down direction in a region between the third support pin P3 and the attachment section 31 in the first direction X is smaller than that in a region closer to the first-direction first side X1 than the third support pin P3. In this example, the dimension of the second support frame 37*b* in the up-down direction is formed smaller than the dimension of the first support frame 37*a* in the up-down direction. In the example illustrated herein, the second support frame 37*b* is formed such that the second support frame 37*b* is partially cut upward from the position of the bottom end of the first support frame 37*a* in the up-down direction, and hereby, the second support frame 37*b* is smaller than the first support frame 37*a* and the third support frame 37*c* in dimension in the up-down direction. Further, in the example illustrated herein, the dimension of the third support frame 37*c* in the up-down direction is formed larger than the dimensions of the first support frame 37*a* and the second support frame 37*b* in the up-down direction. Note that the support frame section 37 may be formed such that the dimension in the up-down direction gradually decreases as it goes toward the first-direction second side X2 from the end part on the first-direction first side X1. Even in that case, since the second abutment section 36 is bent from the side edge of the third support frame 37*c*, it is preferable that the dimension of the third support frame 37*c* in the up-down direction have a size corresponding to the dimension of the second abutment section 36 in the up-down direction. Note that, in the example illustrated herein, the support frame section 37, the support plate section 32, the first abutment section 35, and the second abutment section 36 are formed integrally. However, these sections may be formed of respective members independent from each other. Further, some of these sections may be formed integrally, and the remaining sections may be formed of independent members.

As illustrated in FIGS. 3, 4, and 5, the support plate section 32 is formed continuously from the second abutment section 36 toward the first-direction first side X1 such that the support plate section 32 can support the article W from the lower side via the three support pins (the first support pin P1, the second support pin P2, the third support pin P3). The support plate section 32 has: the notch 33 penetrating through the support plate section 32 in the up-down direction and opened toward the first-direction first side X1 so that the support section 41 of the transfer device 4 can pass through the support plate section 32 in the up-down direction; and the through-opening 34 disposed closer to the first-direction second side X2 than the notch 33 and penetrating through the support plate section 32 in the up-down direction. In the present embodiment, the notch 33 has a shape corresponding to the outer shape of the support section 41. As illustrated in FIG. 5, a dimension U1 of the notch 33 in the first direction X is equal to or more than half of a dimension S1 of the support plate section 32 in the first direction X, and a dimension U2 of the notch 33 in the second direction Y is equal to or more than half of a dimension S2 of the support plate section 32 in the second direction Y. Thus, the support plate section 32 is cut widely in the first direction X and the second direction Y. In the example illustrated herein, the support plate section 32 is formed in a rectangular shape in a top-bottom view. The dimension S1 of the support plate section 32 in the first direction X is formed larger than the dimension S2 of the support plate section 32 in the second direction Y. Further, the dimension U1 of the notch 33 in the first direction X is formed larger than the dimension U2 of the notch 33 in the second direction Y. Note that, in the example in FIG. 5, the dimension U1 of the notch 33 in the first direction X is a maximum dimension of the notch 33 in the first direction X, and the dimension U2 of the notch 33 in the second direction Y is a maximum dimension of the notch 33 in the second direction Y.

As illustrated in FIGS. 3 and 5, the first support pin P1 and the second support pin P2 are disposed on opposite sides across the notch 33 in the second direction Y. In the present embodiment, the first support pin P1 and the second support pin P2 are disposed in a range where the notch 33 is formed in the first direction X. In this example, the first support pin P1 and the second support pin P2 are disposed on opposite sides across the notch 33 in the second direction Y and are disposed closer to the first-direction first side X1 (herein, a distal region of the support plate section 32) than the middle position, in the first direction X, of the notch 33. Further, as illustrated in FIGS. 3 to 5, the third support pin P3 is disposed between the notch 33 and the through-opening 34 in the first direction X. In the present embodiment, the third support pin P3 is further disposed in an intermediate region of the support plate section 32 in the second direction Y. In a case where the article W is transferred to the shelf body 3 by the transfer device 4, these three support pins are engaged with the three engagement sections M provided on the bottom surface of the article W. Hereby, the three support pins support the article W from the lower side. More specifically, the support section 41 of the transfer device 4 on which the article W is placed is disposed right above the notch 33 of the shelf body 3 by the drive mechanism 42. After that, as the lifting and lowering table 43 is lowered, the support section 41 passes through the notch 33 to be disposed right under the notch 33. Hereby, the article W is transferred from the three transfer support pins Q of the support section 41 onto the first support pin P1, the second support pin P2, and the third support pin P3 of the support plate section 32. Note that, in a case where the transfer device 4 takes the article W out of the shelf body 3 and transports the article W, the transfer device 4 moves the support section 41 from right under the notch 33 to right above the notch 33 to scoop the article W supported by the three support pins.

As illustrated in FIGS. 3 and 5, the through-opening 34 is disposed between the third support pin P3 and the attachment section 31 in the first direction X and has a dimension T2, in the second direction Y, that is larger than a dimension T1 in the first direction X. In the present embodiment, the support plate section 32 has a single through-opening 34. The dimension T2 of the through-opening 34 in the second direction Y is equal to or more than half of the dimension S2 of the support plate section 32 in the second direction Y. Further, the dimension T1 of the through-opening 34 in the first direction X is less than half of the dimension S1 of the support plate section 32 in the first direction X. In this example, the through-opening 34 is formed in a rectangular shape in a top-bottom view. Note that the "rectangular shape" herein does not need to be a shape with four orthogonal vertex parts in a quadrangular shape, and the "rectangular shape" includes a shape round outwardly from the through-opening 34, for example. The shape of the through-opening 34 is not limited into the rectangular shape and may be shapes such as a polygonal shape or an elliptical shape, for example. It is preferable that the shape of the through-opening 34 be changeable appropriately as necessary. Note that, in the example in FIG. 5, the dimension T1 of the through-opening 34 in the first direction X is a maximum dimension of the through-opening 34 in the first direction X, and the dimension T2 of the through-opening 34 in the second direction Y is a maximum dimension of the through-opening 34 in the second direction Y. Since the support plate section 32 has the through-opening 34 as described above, the airflow flowing downward from the upper side can pass through the through-opening 34 in addition to the notch 33 when no article W is supported, for example. The following describes effects obtained by the through-opening 34 being formed in the support plate section 32 from different viewpoints with reference to FIG. 8.

Figure 8:
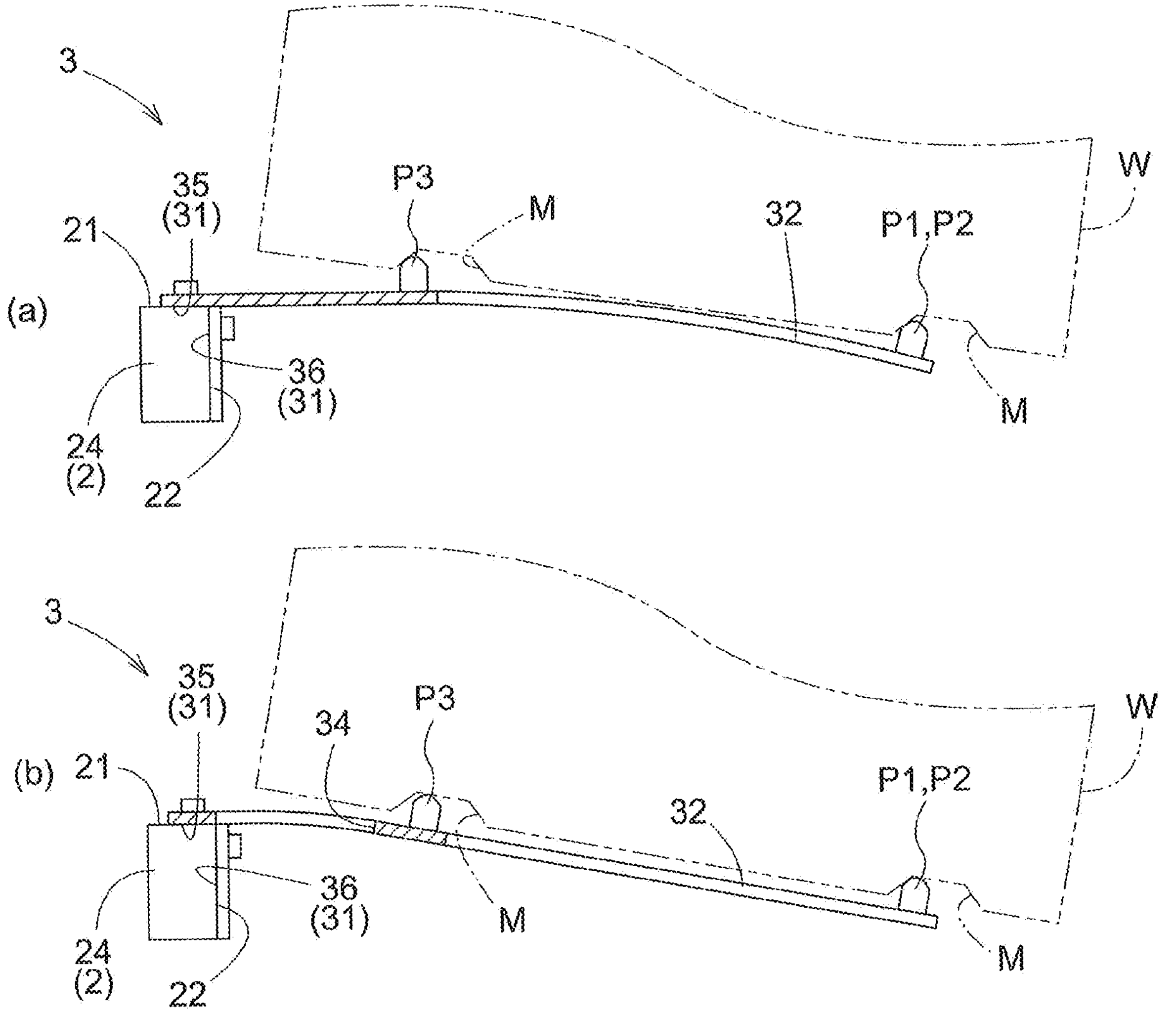
FIG. 8 is a side view schematically illustrating a state where a support plate section bends.

FIG. 8(*a*) schematically illustrates the shelf body 3 in a case where the support plate section 32 has no through-opening 34, as a comparative example. In a case where the support plate section 32 has no through-opening 34, the rigidity of a part, of the support plate section 32, where the notch 33 is formed (here, a part between the third support pin P3 of the support plate section 32 and the attachment section 31 in the first direction X) is lower than the rigidity of a part closer to the first-direction second side X2 (a base end side of the support plate section 32) than the notch 33. Because of this, as illustrated in FIG. 8(*a*), while the article W is supported by the shelf body 3, the part where the notch 33 is formed is easy to bend largely as compared to the part closer to the first-direction second side X2 than the notch 33. When large bending occurs in a state where the article W is supported, the flatness of the support plate section 32 between the third support pin P3 and each of the first support pin P1 and the second support pin P2 decreases, thereby making it difficult to engage the three support pins of the support plate section 32 with the engagement sections M of the article W appropriately.

FIG. 8(*b*) schematically illustrates the shelf body 3 in a case where the support plate section 32 has the through-opening 34, like the technology according to this disclosure. In a case where the support plate section 32 has the through-opening 34, the rigidity of a part, of the support plate section 32, where the through-opening 34 is formed (here, a part closer to the first-direction second side X2 than the notch 33)

decreases as compared with the case where no through-opening 34 is formed, so that the part easily bends. Accordingly, the rigidity of the support plate section 32 between the third support pin P3 and each of the first support pin P1 and the second support pin P2 can be relatively raised, thereby making it possible to restrain bending in a part between the third support pin P3 and each of the first support pin P1 and the second support pin P2 while the article W is supported by the shelf body 3. Accordingly, while the article W is supported, it is possible to restrain a decrease in flatness of the support plate section 32 between the third support pin P3 and each of the first support pin P1 and the second support pin P2. Accordingly, the three support pins of the support plate section 32 are easily engaged with the engagement sections M of the article W appropriately, and the stability of support for the article W is easily secured. Note that, in FIG. 8, in order to describe the bending of the support plate section 32 clearly, the bending of the support plate section 32 is illustrated larger than actual bending.

Further, in this example, as described above, the dimension of the second support frame 37*b* in the up-down direction is formed smaller than the dimension of the first support frame 37*a* in the up-down direction. This accordingly makes it possible to lower the rigidity of a part where the through-opening 34 is formed, the part being between the third support pin P3 of the support plate section 32 and the attachment section 31 in the first direction X, so that the part can easily bend. As a result, it is possible to further restrain bending in the support plate section 32 between the third support pin P3 and each of the first support pin P1 and the second support pin P2, so that the flatness between the third support pin P3 and each of the first support pin P1 and the second support pin P2 is easily secured. Hereby, it is possible to easily secure the stability of support for the article W effectively.

Figure 9:
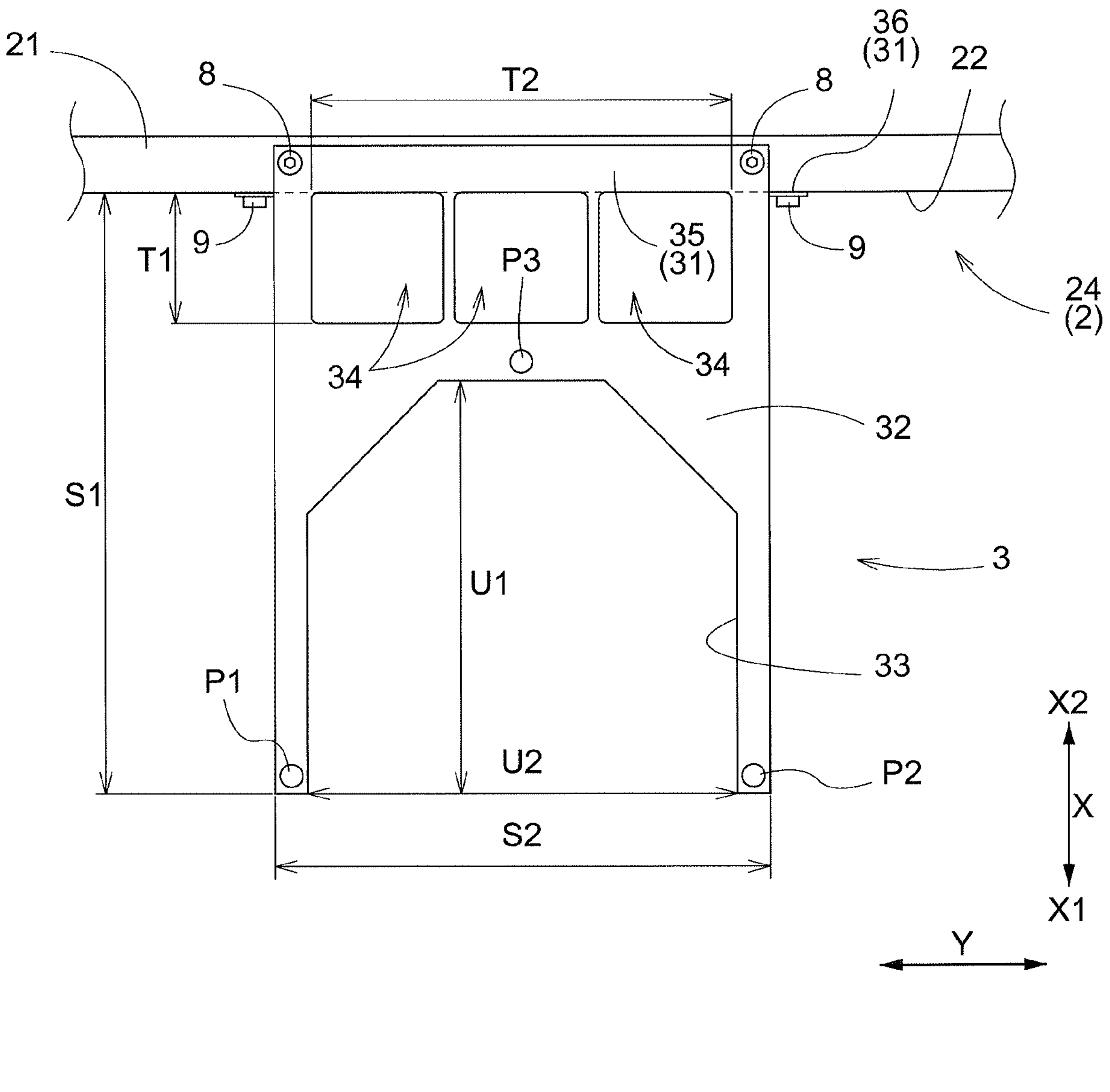
FIG. 9 is a plan view of a shelf body in another embodiment.

Other Embodiments (1) The above embodiment has described, as an example, the configuration in which the support plate section 32 has only one through-opening 34, but the present invention is not limited to this. For example, the support plate section 32 has a plurality of through-openings 34. More specifically, the plurality of through-openings 34 can be aligned in at least either of the first direction X and the second direction Y. In a case where the support plate section 32 has the plurality of through-openings 34 as such, the dimension of the through-opening 34 in the first direction X or the second direction Y may be defined not as the dimension of one through-opening 34 but as the dimension of a circumscribed rectangle (a rectangle having two sides along the first direction X and two sides along the second direction Y) around the set of the plurality of through-openings 34 in a plan view (a directional view along the up-down direction). That is, the dimension, in the first direction X or the second direction Y, of a region where the plurality of through-openings 34 is formed may be defined as the dimension of the through-opening 34 in the first direction X or the second direction Y. An example of such a configuration is illustrated in FIG. 9. In FIG. 9, a plurality of (here, three) through-openings 34 is aligned along the second direction Y. The dimension T2 of the through-opening 34 in the second direction Y is the dimension, in the second direction Y, of a circumscribed rectangle around the set of the plurality of through-openings 34. The dimension T2, in the second direction Y, of the circumscribed rectangle around the set of the plurality of through-openings 34 aligned in the second direction Y (here, the dimension T2 of the through-opening 34 in the second direction Y) is formed larger than the dimension T1 of the through-opening 34 in the first direction X. Note that, in the example in FIG. 9, each of the plurality of through-openings 34 is formed such that the dimensions in the first direction X and in the second direction Y are equal to each other, but the dimension in the first direction X may be different from the dimension in the second direction Y.

(2) The above embodiment has described, as an example, the configuration in which the dimension T2 of the through-opening 34 in the second direction Y is equal to or more than half of the dimension S2 of the support plate section 32 in the second direction Y, but the present invention is not limited to this. For example, the dimension T2 of the through-opening 34 in the second direction Y may be less than half of the dimension S2 of the support plate section 32 in the second direction Y. Further, the dimension T1 of the through-opening 34 in the first direction X can be changed appropriately in accordance with the dimension U1 of the notch 33 in the first direction X. Thus, the dimension (the dimension T1 in the first direction X, the dimension T2 in the second direction Y) of the through-opening 34 is modifiable as necessary.

(3) The above embodiment has described, as an example, the configuration in which the dimension U1 of the notch 33 in the first direction X is equal to or more than half of the dimension S1 of the support plate section 32 in the first direction X, and the dimension U2 of the notch 33 in the second direction Y is equal to or more than half of the dimension S2 of the support plate section 32 in the second direction Y. However, the present invention is not limited to this, and the dimension U1 of the notch 33 in the first direction X and the dimension U2 of the notch 33 in the second direction Y are modifiable appropriately. Further, the shape of the notch 33 is also modifiable appropriately.

Figure 10:
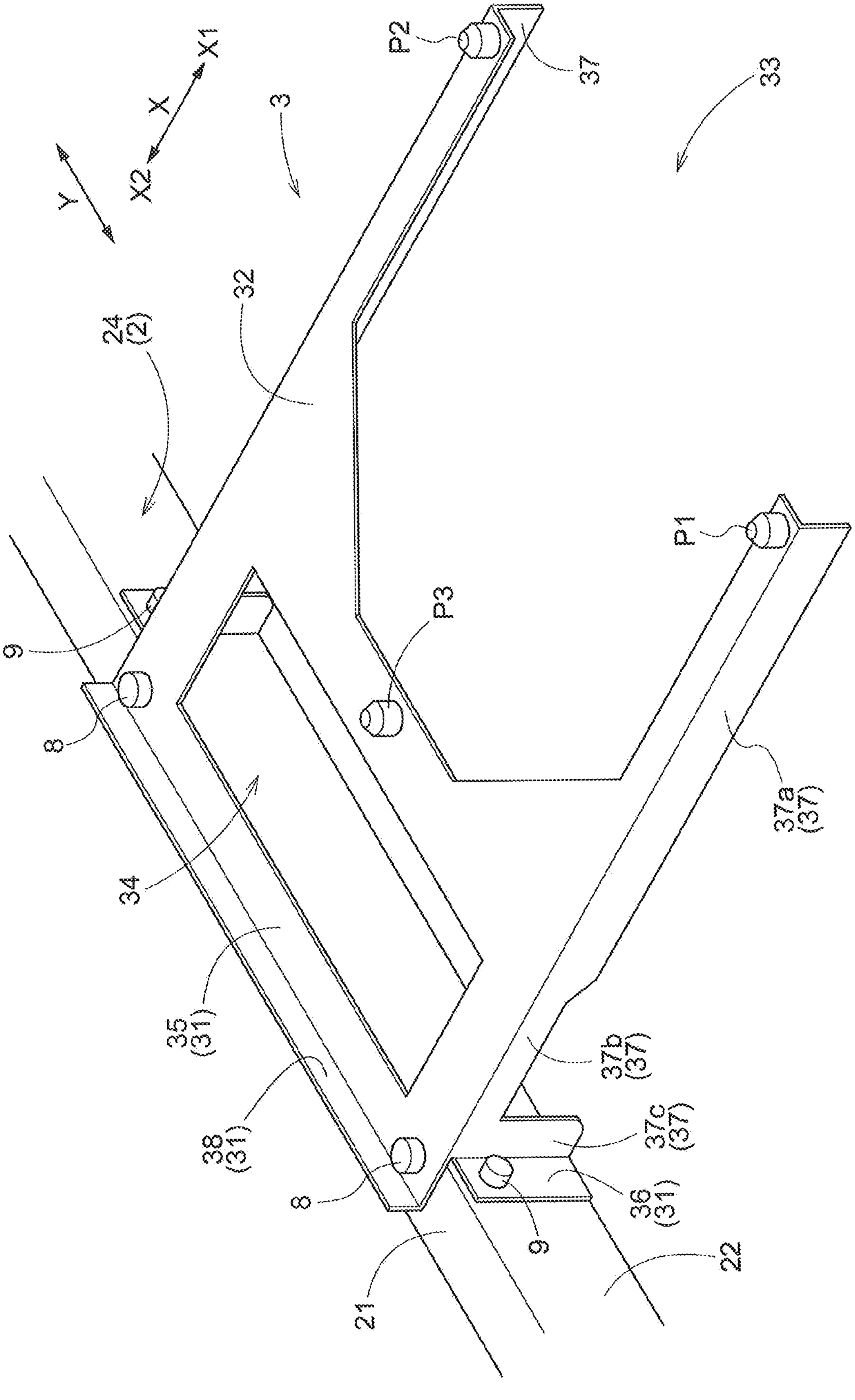
FIG. 10 is a perspective view of a shelf body in another embodiment.

(4) The above embodiment has described, as an example, the configuration in which the attachment section 31 includes the first abutment section 35 abutting with the top surface 21 and the second abutment section 36 abutting with the reference surface 22. However, the present invention is not limited to this. For example, the attachment section 31 may further include a rib section 38 for reinforcing the first abutment section 35, and an example of such a configuration is illustrated in FIG. 10. In FIG. 10, the first abutment section 35 includes the rib section 38. More specifically, the rib section 38 is provided to be bent upward from the end part, on the first-direction second side X2, of the first abutment section 35. Further, the rib section 38 is made of a belt-shaped member extending along the second direction Y and the up-down direction. In the example illustrated herein, the rib section 38 is continuous with the top surface 21 of the first abutment section 35 and is formed integrally with the first abutment section 35. Note that the rib section 38 may be constituted by a member different from the first abutment section 35.

(5) The above embodiment has described, as an example, the configuration in which the first abutment section 35 is fastened and fixed to the top surface 21 of the traverse member 24 by the first fastening member 8, the second abutment section 36 is fastened and fixed, by the second fastening member, 9, to the reference surface 22 (here, the surface, of the traverse member 24, that faces the first-direction first side X1), so that the shelf body 3 is supported by the shelf frame 2. However, the present invention is not limited to this. For example, only either of the first abutment section 35 and the second abutment section 36 may be fastened and fixed to the shelf frame 2 (here, the traverse member 24). Further, for example, the shelf body 3 may further include a third abutment section abutting with the bottom surface of the traverse member 24, and the third abutment section may be fastened and fixed to the bottom surface of the traverse member 24 by a fastening member different from the first fastening member 8 and the second fastening member 9.

(6) The above embodiment has described, as an example, the configuration in which the second fastening member 9 is disposed above the middle position, in the up-down direction, of the second abutment section 36, but the present invention is not limited to this. For example, the second fastening member 9 may be disposed at the middle position, in the up-down direction, of the second abutment section 36 or may be disposed below the middle position. Further, the second abutment section 36 may be fastened and fixed to the reference surface 22 by a plurality of second fastening members 9 disposed at different positions in the up-down direction.

(7) The above embodiment has described, as an example, the configuration in which the shelf body 3 includes the support frame sections 37 formed to be bent downward respectively from opposite side edges, in the second direction Y, of the support plate section 32. However, the present invention is not limited to this. For example, the shelf body 3 does not need to include the support frame sections 37. Further, for example, the shelf body 3 can include the support frame section 37 only on one side in the second direction Y.

(8) Note that the configurations disclosed in the above embodiment can be applied in combination with the configurations disclosed in other embodiments (including combinations of the embodiments described as other embodiments) as long as no inconsistency occurs. In terms of other configurations, the embodiment disclosed in the present specification is also just an example in all respects. Accordingly, various modifications can be made appropriately as far as it does not deviate from the scope of this disclosure.

Outline of Embodiment

The following describes the outline of the article storage shelf described above.

An article storage shelf according to this disclosure includes: a shelf frame; a shelf body attached to the shelf frame in a cantilever manner and configured to support an article as a storage target; and a transfer device configured to transfer the article supported by the shelf body. When a first direction is a specific direction along a horizontal plane, a first-direction first side is one side in the first direction, a first-direction second side is the other side in the first direction, and a second direction is a direction along the horizontal plane and perpendicular to the first direction, the transfer device includes a support section configured to support the article, and a drive mechanism configured to advance and retract the support section in the first direction and to lift and lower the support section in an up-down direction. The shelf body includes an attachment section attached to the shelf frame, a support plate section disposed to project from the attachment section toward the first-direction first side and formed in a plate shape along the horizontal plane, and a first support pin, a second support pin, and a third support pin as three support pins fixed to the support plate section to project upward from the support plate section such that the three support pins support the article from a lower side. The support plate section has a notch penetrating through the support plate section in the up-down direction and opened toward the first-direction first side such that the support section of the transfer device is passable through the notch in the up-down direction, and a through-opening disposed on the first-direction second side relative to the notch and penetrating through the support plate section in the up-down direction. The first support pin and the second support pin are disposed on opposite sides across the notch in the second direction. The third support pin is disposed between the notch and the through-opening in the first direction. The through-opening is disposed between the third support pin and the attachment section in the first direction and has a dimension, in the second direction, that is larger than a dimension in the first direction.

In this configuration, the support plate section has the through-opening penetrating therethrough in the up-down direction and formed between the third support pin of the support plate section and the attachment section in the first direction. The through-opening has the dimension, in the second direction (the width direction of the support plate section), that is larger than the dimension in the first direction (the depth direction of the support plate section). Hereby, the rigidity of a part between the third support pin of the support plate section and the attachment section in the first direction is lowered as compared with a case where no through-opening is formed, so that the part easily bends. This accordingly makes it possible to relatively raise the rigidity of a part of the support plate section between the third support pin and each of the first support pin and the second support pin, thereby making it possible to restrain bending in the part between the third support pin and each of the first support pin and the second support pin while the article is supported. Accordingly, while the article is supported, the flatness of the support plate section between the third support pin and each of the first support pin and the second support pin is easily secured, so that the stability of support for the article is easily secured.

Further, in this configuration, when downflow as airflow flowing downward is generated inside the article storage shelf, the airflow can pass through the through-opening as well as the notch. That is, the shelf body can be made hard to prevent the downflow, as compared with a case where no through-opening is formed.

Thus, with this configuration, even in a case where the notch is formed in the support plate section of the shelf body, the stability of support for the article is easily secured with a relatively simple configuration.

Here, it is preferable that: the notch have a dimension, in the first direction, that is equal to or more than half of a dimension of the support plate section in the first direction; the notch have a dimension, in the second direction, that is equal to or more than half of a dimension of the support plate section in the second direction; and the through-opening have a dimension, in the second direction, that is equal to or more than half of the dimension of the support plate section in the second direction.

In a case where the notch occupies a large area out of the whole area of the support plate section, the flatness of the support plate section particularly between the third support pin and each of the first support pin and the second support pin easily decreases. However, in this configuration, the dimension of the through-opening in the second direction is equal to or more than half of the dimension of the support plate section in the second direction. Accordingly, it is possible to sufficiently decrease the rigidity of a part between the third support pin of the support plate section and the attachment section in the first direction, so that the part can easily bend. This accordingly makes it possible to easily secure the flatness of the support plate section between the third support pin and each of the first support pin and the second support pin, so that the stability of support for the article is easily secured.

Further, it is preferable that: the shelf frame have a top surface facing upward and a reference surface facing the first-direction first side; the attachment section include a first abutment section abutting with the top surface and a second abutment section abutting with the reference surface; the first abutment section be fastened and fixed to the top surface by a first fastening member, and the second abutment section be fastened and fixed to the reference surface by a second fastening member.

With this configuration, the shelf body can be fixed to the shelf frame with the shelf body being positioned in the up-down direction and the first direction relative to the shelf frame. This makes it possible to easily raise the positional accuracy of the shelf body.

Further, it is preferable that the second fastening member be disposed above a middle position, in the up-down direction, of the second abutment section.

With this configuration, an upper part of the second abutment section is easily brought into contact with the reference surface without any gap. Further, while the article is supported by the shelf body, a lower part of the second abutment section receives a force in a direction where the lower part is pressed against the reference surface. Accordingly, with this configuration, the whole second abutment section is easily brought into contact with the reference surface without any gap. This makes it possible to easily raise the positional accuracy of the shelf body.

Further, it is preferable that: the shelf body further include support frame sections formed to be bent downward from opposite side edges, in the second direction, of the support plate section; and the support frame section be formed in a range from a position, in the first direction, where the first support pin and the second support pin are disposed to the attachment section.

With this configuration, bending of the support plate section in the up-down direction is easily restrained to be small, so that the flatness of the support plate section is easily raised.

The article storage shelf according to this disclosure should be able to yield at least one of the above effects.

What is claimed is:

1. An article storage shelf comprising:
a shelf frame;
a shelf body attached to the shelf frame in a cantilever manner and configured to support an article as a storage target; and
a transfer device configured to transfer the article supported by the shelf body,
wherein:
when a first direction is a specific direction along a horizontal plane, a first-direction first side is one side in the first direction, a first-direction second side is the other side in the first direction, and a second direction is a direction along the horizontal plane and perpendicular to the first direction, the transfer device comprises a support section configured to support the article, and a drive mechanism configured to advance and retract the support section in the first direction and to lift and lower the support section in an up-down direction;
the shelf body comprises:
an attachment section attached to the shelf frame,
a support plate section disposed to project from the attachment section toward the first-direction first side and formed in a plate shape along the horizontal plane, and
a first support pin, a second support pin, and a third support pin as three support pins fixed to the support plate section to project upward from the support plate section such that the three support pins support the article from a lower side;
the support plate section has:
a notch penetrating through the support plate section in the up-down direction and opened toward the first-direction first side such that the support section of the transfer device is passable through the notch in the up-down direction, and
a through-opening disposed on the first-direction second side relative to the notch and penetrating through the support plate section in the up-down direction;
the first support pin and the second support pin are disposed on opposite sides across the notch in the second direction;
the third support pin is disposed between the notch and the through-opening in the first direction;
the through-opening is disposed between the third support pin and the attachment section in the first direction and has a dimension, in the second direction, that is larger than a dimension in the first direction; and
the through-opening has a dimension, in the second direction, that is equal to or more than half of the dimension of the support plate section in the second direction.

2. The article storage shelf according to claim 1, wherein:
the notch has a dimension, in the first direction, that is equal to or more than half of a dimension of the support plate section in the first direction;
the notch has a dimension, in the second direction, that is equal to or more than half of a dimension of the support plate section in the second direction.

3. The article storage shelf according to claim 1, wherein:
the shelf frame has a top surface facing upward and a reference surface facing the first-direction first side;
the attachment section comprises a first abutment section abutting with the top surface and a second abutment section abutting with the reference surface;
the first abutment section is fastened and fixed to the top surface by a first fastening member; and
the second abutment section is fastened and fixed to the reference surface by a second fastening member.

4. An article storage shelf comprising:
a shelf frame;
a shelf body attached to the shelf frame in a cantilever manner and configured to support an article as a storage target; and
a transfer device configured to transfer the article supported by the shelf body,
wherein:
when a first direction is a specific direction along a horizontal plane, a first-direction first side is one side in the first direction, a first-direction second side is the other side in the first direction, and a second direction is a direction along the horizontal plane and perpendicular to the first direction, the transfer device comprises a support section configured to support the article, and a drive mechanism configured to advance and retract the support section in the first direction and to lift and lower the support section in an up-down direction;

the shelf body comprises:

an attachment section attached to the shelf frame, a support plate section disposed to project from the attachment section toward the first-direction first side and formed in a plate shape along the horizontal plane, and a first support pin, a second support pin, and a third support pin as three support pins fixed to the support plate section to project upward from the support plate section such that the three support pins support the article from a lower side;

the support plate section has:

a notch penetrating through the support plate section in the up-down direction and opened toward the first-direction first side such that the support section of the transfer device is passable through the notch in the up-down direction, and a through-opening disposed on the first-direction second side relative to the notch and penetrating through the support plate section in the up-down direction;

the first support pin and the second support pin are disposed on opposite sides across the notch in the second direction;

the third support pin is disposed between the notch and the through-opening in the first direction;

the through-opening is disposed between the third support pin and the attachment section in the first direction and has a dimension, in the second direction, that is larger than a dimension in the first direction;

the shelf frame has a reference surface facing the first-direction first side;

the attachment section comprises an abutment section abutting with the reference surface;

the abutment section is fastened and fixed to the reference surface by a fastening member; and the fastening member is disposed above a middle position, in the up-down direction, of the abutment section.

5. The article storage shelf according to claim 1, wherein:

the shelf body further comprises support frame sections formed to be bent downward from opposite side edges, in the second direction, of the support plate section; and the support frame section is formed in a range from a position, in the first direction, where the first support pin and the second support pin are disposed to the attachment section.

6. The article storage shelf according to claim 4, wherein:

the abutment section is a second abutment section, and the fastening member is a second fastening member;

the shelf frame has a top surface facing upward;

the attachment section comprises a first abutment section abutting with the top surface; and the first abutment section is fastened and fixed to the top surface by a first fastening member.

7. The article storage shelf according to claim 1, wherein:

the through-opening has a dimension, in the first direction, that is equal to or more than half of the dimension between the third support pin and the attachment section in the first direction.

8. An article storage shelf comprising:

a shelf frame;

a shelf body attached to the shelf frame in a cantilever manner and configured to support an article as a storage target; and a transfer device configured to transfer the article supported by the shelf body, wherein:

when a first direction is a specific direction along a horizontal plane, a first-direction first side is one side in the first direction, a first-direction second side is the other side in the first direction, and a second direction is a direction along the horizontal plane and perpendicular to the first direction, the transfer device comprises a support section configured to support the article, and a drive mechanism configured to advance and retract the support section in the first direction and to lift and lower the support section in an up-down direction;

the shelf body comprises:

an attachment section attached to the shelf frame, a support plate section disposed to project from the attachment section toward the first-direction first side and formed in a plate shape along the horizontal plane, and a first support pin, a second support pin, and a third support pin as three support pins fixed to the support plate section to project upward from the support plate section such that the three support pins support the article from a lower side;

the support plate section has:

a notch penetrating through the support plate section in the up-down direction and opened toward the first-direction first side such that the support section of the transfer device is passable through the notch in the up-down direction, and a through-opening disposed on the first-direction second side relative to the notch and penetrating through the support plate section in the up-down direction;

the first support pin and the second support pin are disposed on opposite sides across the notch in the second direction;

the third support pin is disposed between the notch and the through-opening in the first direction;

the through-opening is disposed between the third support pin and the attachment section in the first direction and has a dimension, in the second direction, that is larger than a dimension in the first direction;

the shelf body further comprises support frame sections formed to be bent downward from opposite side edges, in the second direction, of the support plate section;

the support frame section is formed in a range from a position, in the first direction, where the first support pin and the second support pin are disposed to the attachment section; and a dimension of the support frame section in an up-down direction in a region between the third support pin and the attachment section in the first direction is smaller than a dimension of the support frame section in the up-down direction in a region on the first-direction first side relative to the third support pin in the first direction.

* * * * *